(No Model.)

D. D. MOUNTS.
STEAM COOKING APPARATUS.

No. 345,391. Patented July 13, 1886.

Witnesses,
Geo. H. Strong.
J. H. Rourke.

Inventor,
D. D. Mounts
By
Dewey & Co.
Attorneys

UNITED STATES PATENT OFFICE.

DANIEL D. MOUNTS, OF SAN FRANCISCO, CALIFORNIA.

STEAM-COOKING APPARATUS.

SPECIFICATION forming part of Letters Patent No. 345,391, dated July 13, 1886.

Application filed September 4, 1885. Serial No. 176,207. (No model.)

*To all whom it may concern:*

Be it known that I, DANIEL D. MOUNTS, of the city and county of San Francisco, State of California, have invented an Improvement in Steam-Cooking Apparatus; and I hereby declare the following to be a full, clear, and exact description of the same.

My invention relates to that class of apparatus which is used for cooking fruit by means of steam; and my invention consists in the construction and combination of devices, all of which I shall hereinafter fully explain.

Figure 1:
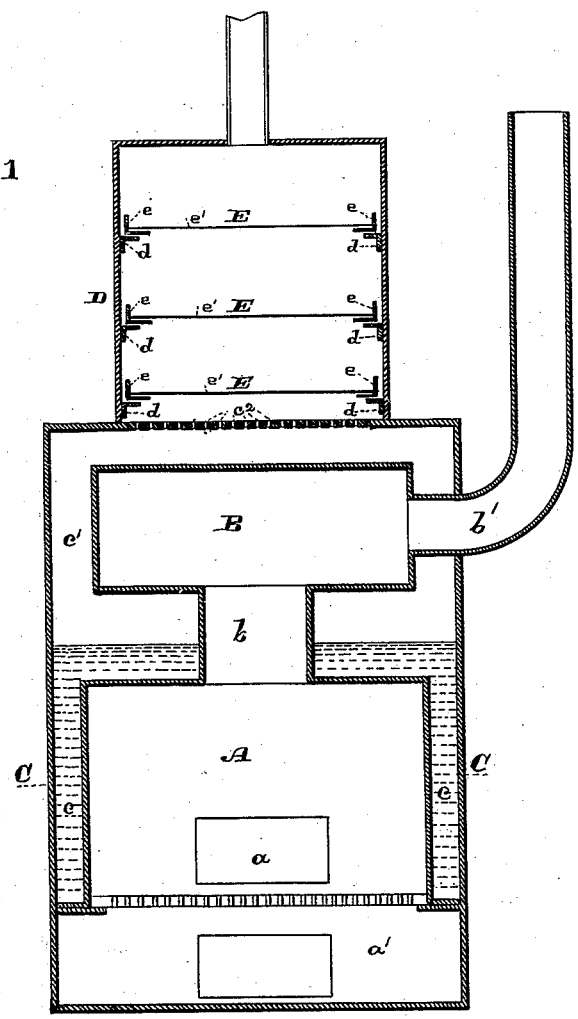
Figure 2:
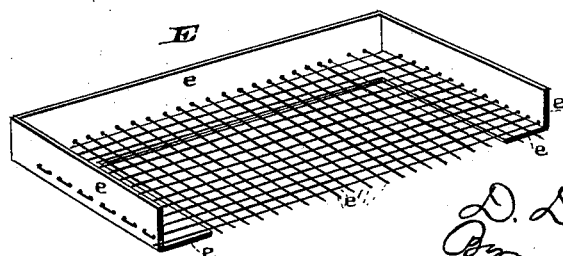

Referring to the accompanying drawings, Figure 1 is a vertical section of my apparatus. Fig. 2 shows the construction of the trays.

A is a casing constituting the fire-chamber, and provided with a fire-door, $a$, and an ash-box, $a'$, below.

B is a hollow drum communicating with the fire-chamber through a pipe, $b$, and having an outlet, $b'$, the diameter of which, it will be observed, is less than that of the pipe $b$.

C is an outer casing or shell fitting over the casing A and drum B, and forming between itself and the former a space for water, $c$, and around the latter and above it a steam-space, $c'$. The top of the casing C is perforated with a number of very small holes, $c^2$.

D is a rectangular receptacle, which is mounted on top of the casing or shell C, over its small holes $c^2$. This contains guides $d$ in its sides which support the trays E, upon which the jars of fruit rest.

The trays E are made as follows: The rim consists of angle-iron strips $e$, which are perforated near the lower edge of the upright section, and wires $e'$ are passed through said perforations back and forth across the inclosed space of the rim, thus forming a foraminous support for the jars.

The advantage of the angle-iron rim is that its lower or horizontal portion acts as a support for the wires to a certain distance, thereby strengthening and stiffening them; and it will therefore be observed that any other light material will answer the purpose, provided it be angled in cross-section.

The operation of my apparatus is as follows: A fire is kindled in the casing A, and the products of combustion ascend through pipe $b$ into the drum B. In this, on account of the exit $b'$ being of less capacity than the inlet, these products are held and materially raise the temperature of the drum. The water in the water-jacket $c$ is heated by the fire in chamber A to such an extent that steam being generated rises into the space $c'$. In this space it is superheated by contact with the drum B. It is discharged in small quantities under considerable pressure through the small holes $c^2$. These holes, on account of their size, create sufficient pressure of the steam within to cause said steam to be discharged equally. This steam rising into the receptacle D passes through the foraminous trays E and cooks the fruit. It will therefore be observed that my machine is complete in itself, embodying the source of heat, the steam-generating water, the superheating device, and distributer, by which the steam is discharged equally, and the receptacle containing the fruit-jars.

Having thus described my invention, what I claim as new, and desire to secure by Letters Patent, is—

1. The combination of the inner casing, A, forming the fire-box, the drum B, the pipe $b$, connecting the drum with the fire-chamber, and the exit-pipe $b'$, of smaller diameter than the inlet-pipe $b$, the outer casing, C, forming between itself and the inner casing a water-jacket, $c$, and a steam-space, $c'$, above and surrounding the drum B, the receptacle D, mounted on top of the outer casing and communicating through suitable apertures with its steam-space, substantially as herein described.

2. A steam-cooking apparatus comprising the inner casing, A, forming the fire-chamber, the drum B, the pipe $b$, connecting said drum with the casing A, the pipe $b'$, of smaller diameter than pipe $b$, the outer casing, C, forming between itself and the inner casing a water-jacket, $c$, and a steam-space, $c'$, surrounding the drum B, the small holes $c^2$ in the top of the casing, the receptacle D, mounted upon said outer casing and communicating with the steam-space by means of the small openings $c^2$, and the trays E, mounted in said receptacle, substantially as herein described.

In witness whereof I have hereunto set my hand.

D. D. MOUNTS.

Witnesses:
S. H. NOURSE,
H. C. LEE.